(12) United States Patent
Gu et al.

(10) Patent No.: US 11,710,337 B2
(45) Date of Patent: *Jul. 25, 2023

(54) FINGERPRINT IDENTIFICATION METHOD AND APPARATUS, STORAGE MEDIUM AND TERMINAL

(71) Applicant: Shanghai Harvest Intelligence Technology Co., Ltd., Shanghai (CN)

(72) Inventors: Fengjun Gu, Shanghai (CN); Sheng Feng, Shanghai (CN); Fei Wang, Shanghai (CN); Xueke Hu, Shanghai (CN); Tianyang Wang, Shanghai (CN)

(73) Assignee: Shanghai Harvest Intelligence Technology Co., Ltd., Shanghai (CN)

( * ) Notice: Subject to any disclaimer, the term of this patent is extended or adjusted under 35 U.S.C. 154(b) by 7 days.

This patent is subject to a terminal disclaimer.

(21) Appl. No.: 17/365,817

(22) Filed: Jul. 1, 2021

(65) Prior Publication Data
US 2021/0326562 A1 Oct. 21, 2021

Related U.S. Application Data

(63) Continuation of application No. 16/714,308, filed on Dec. 13, 2019, now Pat. No. 11,080,506.

(30) Foreign Application Priority Data

Dec. 14, 2018 (CN) .......................... 201811532017.6

(51) Int. Cl.
*G06V 40/13* (2022.01)

(52) U.S. Cl.
CPC .............................. *G06V 40/1318* (2022.01)

(58) Field of Classification Search
CPC . G06K 9/00053; G06F 1/1684; G06F 1/1626; H04M 1/026
See application file for complete search history.

(56) References Cited

U.S. PATENT DOCUMENTS

| 2015/0277503 | A1 | 10/2015 | Eremenko et al. |
| 2018/0034948 | A1 | 2/2018 | Yu et al. |
| 2019/0294856 | A1 | 9/2019 | Yu et al. |
| 2019/0294857 | A1 | 9/2019 | Yu et al. |
| 2019/0325186 | A1 | 10/2019 | Gao et al. |
| 2019/0325190 | A1* | 10/2019 | Cui .................... G06V 40/13 |

(Continued)

*Primary Examiner* — Bobbak Safaipour
(74) *Attorney, Agent, or Firm* — Harness, Dickey & Pierce, P.L.C.

(57) ABSTRACT

A fingerprint identification apparatus, comprising: a nonopaque nonopaque glass cover plate, a display unit, an optical film, an imaging unit, and a photoelectric sensing unit, wherein the nonopaque glass cover plate has a touch interface for contacting a to-be-identified fingerprint; the display unit is provided with a plurality of pixels, a part of the plurality of pixels form one or more point light source regions; the optical film is provided with a light-transmitting region allowing light to pass through the optical film and a light-blocking region configured for preventing light from passing through the optical film; light emitted from one or more point light source region is reflected by an upper surface of the nonopaque cover glass, the reflected light passes through the nonopaque cover glass, the display unit, and the light-transmitting region of the optical film, and is imaged by the imaging unit onto the photoelectric sensing unit.

17 Claims, 4 Drawing Sheets

(56) References Cited

U.S. PATENT DOCUMENTS

| | | |
|---|---|---|
| 2020/0127066 A1 | 4/2020 | Zhang et al. |
| 2020/0143136 A1 | 5/2020 | Huang |
| 2020/0167492 A1 | 5/2020 | Wang et al. |
| 2020/0184182 A1 | 6/2020 | Huang |
| 2020/0193124 A1* | 6/2020 | Gu ................. G06V 40/1318 |
| 2020/0210671 A1* | 7/2020 | Ling ............... G06V 40/1318 |
| 2021/0103714 A1* | 4/2021 | Li .................. G06V 40/1329 |
| 2021/0133421 A1* | 5/2021 | Zeng ............... G06V 40/1324 |
| 2022/0165081 A1* | 5/2022 | Cheng ............. G06V 40/1318 |

* cited by examiner

FINGERPRINT IDENTIFICATION METHOD AND APPARATUS, STORAGE MEDIUM AND TERMINAL

CROSS-REFERENCE TO RELATED APPLICATIONS

The present application is a continuation application of U.S. application Ser. No. 16/714,308, filed on Dec. 13, 2019, which claims the priority to Chinese Patent Application No. 201811532017.6, titled "FINGERPRINT IDENTIFICATION METHOD AND APPARATUS, STORAGE MEDIUM AND TERMINAL", filed on Dec. 14, 2018, which is incorporated herein by reference in its entity.

TECHNICAL FIELD

The present disclosure relates to a fingerprint identification method and apparatus, a storage medium and a terminal.

BACKGROUND

With the rapid development of science and technologies, the fingerprint identification technology has been widely used in many electronic devices, such as smart phones, banking systems and attendance systems.

Since the conventional capacitive fingerprint identification technology can no longer meet a demand for an increased screen proportion of devices, and the ultrasonic fingerprint identification technology has deficiencies in terms of technology maturity and cost, the optical fingerprint identification technology is expected to be a mainstream technical solution for under-screen fingerprint identification.

In the conventional optical fingerprint imaging solution, an image of a to-be-identified fingerprint is collected mainly based on the total reflection imaging principle of physical optics. With the conventional optical fingerprint imaging solution, although a sharp image can be obtained to a certain extent, a sharp and complete fingerprint image of a "dry finger" cannot be obtained.

SUMMARY

An embodiment of the present disclosure provides a fingerprint identification apparatus, which may collect a sharp image of a to-be-identified fingerprint (whether or not the to-be-identified fingerprint is from a dry finger), thereby significantly improving a signal-to-noise ratio and an accuracy of fingerprint identification.

The fingerprint identification apparatus according to the present disclosure includes a nonopaque glass cover plate, a touch sensing unit, a display unit, an optical film, an imaging unit, a photoelectric sensing unit, and a control unit. The nonopaque glass cover plate has a touch interface for contacting with a to-be-identified fingerprint. The touch sensing unit is configured to detect a touch signal of the to-be-identified fingerprint. The display unit is provided with pixels in one or more discrete point light source regions. The control unit is configured to send a display driving signal to the display unit when the touch sensing unit detects the touch signal, to drive at least a part of the pixels in the display unit to be lightened. The optical film is provided with multiple light-transmitting regions and multiple light-blocking regions, and the multiple light-blocking regions are used for blocking light emitted from the at least a part of pixels that directly enters the optical film without being reflected by the nonopaque glass cover plate or the to-be-identified fingerprint. The imaging unit includes a lens group having at least one lens, and is configured to image the to-be-identified fingerprint onto the photoelectric sensing unit, where light emitted by the pixels is irradiated to the to-be-identified fingerprint via the nonopaque glass cover plate. The photoelectric sensing unit is configured to receive a light signal generated by the imaging unit, and convert the light signal to an electric signal.

In an embodiment, the nonopaque glass cover plate, the touch sensing unit, the display unit, the optical film, the imaging unit, the photoelectric sensing unit, and the control unit are sequentially arranged from top to bottom.

In an embodiment, the optical film is located below the display unit, and the plurality of light-blocking regions and the plurality of light-transmitting regions are arranged alternatively with one being surrounded by another.

In an embodiment, the imaging unit has an object focus located in a plane where the optical film is located.

In an embodiment, the multiple light-blocking regions being used for blocking light emitted from the at least a part of pixels comprises that the light-blocking regions are located right below the at least a part of pixels in the display unit which are lightened. In some embodiment, an area of each of the light-blocking regions is equal to or greater than that of each of the at least a part of pixels.

In an embodiment, the point light source regions are arranged in a topological structure and are spaced apart from each other by a lightless pixel region, and each of the point light source regions and the lightless pixel region both include one or more pixels.

In an embodiment, the topological structure includes a multi-point arrangement, a linear arrangement, a parallel line arrangement, a circular arrangement, a circular ring arrangement, a dotted line arrangement, or a parallel dotted line arrangement.

In an embodiment, the multiple light-transmitting regions are located right below the lightless pixel region.

In an embodiment, the optical film has an area smaller than or equal to that of the display unit.

In an embodiment, each of the multiple light-transmitting regions has a width $L_1$ of 0.1 mm to 5 mm. In an embodiment, the width $L_1$ is 0.2 mm to 0.5 mm. In an embodiment, the width $L_1$ is 0.2 mm.

In an embodiment, each of the multiple light-blocking regions has a width $L_2$ of 0.1 mm to 5 mm. In an embodiment, $L_2 \leq L_1$.

According to another aspect, a fingerprint identification method is further provided according to the present disclosure, which includes: sending, by a control unit, a display driving signal to a display unit to drive at least a part of pixels in the display unit to be lightened, when a touch sensing unit detects a touch signal that a to-be-identified fingerprint touches a nonopaque glass cover plate; imaging, by an imaging unit, the to-be-identified fingerprint to which light emitted by the at least a part of pixels is irradiated via the nonopaque glass cover plate, onto a photoelectric sensing unit; receiving, by the photoelectric sensing unit, a light signal emitted by the imaging unit, analyzing the light signal and outputting an image of the to-be-identified fingerprint; and comparing the outputted image of the to-be-identified fingerprint with a standard fingerprint image to determine whether the outputted image of the to-be-identified fingerprint is similar to the standard fingerprint image.

In an embodiment, pixels of the display unit are arranged in one or more point light source regions, the point light source regions are arranged in a topological structure and are spaced apart from each other by a lightless pixel region, and each of the point light source regions and the lightless pixel region both include one or more pixels.

In an embodiment, imaging, by an imaging unit, the to-be-identified fingerprint to which light emitted from the at least a part of pixels is irradiated via the nonopaque glass cover plate, onto a photoelectric sensing unit includes: imaging, by the imaging unit, the to-be-identified fingerprint onto the photoelectric sensing unit, where the light emitted from the at least a part of pixels is irradiated to the to-be-identified fingerprint via the nonopaque glass cover plate, and then passes through multiple light-transmitting regions of an optical film after being reflected by the to-be-identified fingerprint or the nonopaque glass cover plate.

In an embodiment, multiple light-transmitting regions are located right below the lightless pixel region.

In an embodiment, the optical film is provided with multiple light-transmitting regions and multiple light-blocking regions, where the multiple light-blocking regions are located right below the at least a part of pixels in the display unit which are lightened, an area of each of the multiple light-blocking regions is equal to or greater than that of the at least a part of pixels, to block light emitted from the at least a part of pixels that directly enters the optical film without being reflected by the nonopaque glass cover plate or the to-be-identified fingerprint. In an embodiment, the optical film is located below the display unit, the multiple light-blocking regions and the multiple light-transmitting regions are arranged alternatively with one being surrounded by another.

In an embodiment, the imaging unit has an object focus located in a plane where the optical film is located.

According to another aspect, an electronic device is further provided according to the present disclosure, which includes the fingerprint identification apparatus described above.

According to another aspect, a computer-readable storage medium is further provided according to the present disclosure, which has stored thereon computer instructions, wherein the computer instructions are executed to perform steps of the fingerprint identification method described above.

According to another aspect, a terminal is further provided according to the present disclosure, which includes a memory and a processor, wherein the memory has stored thereon computer instructions executable on the processor, and the computer instructions are executed by the processor to perform steps of the fingerprint identification method described above.

Compared with the conventional art, the fingerprint identification apparatus according to the present disclosure is provided with an optical film, and the optical film is provided with multiple light-transmitting regions and multiple light-blocking regions that are arranged in an alternatively bright and dark manner, thus a sharp image of a to-be-identified fingerprint (whether or not the to-be-identified fingerprint is from a dry finger) can be collected, thereby significantly increasing a signal-to-noise ratio (for example, the signal-to-noise ratio can be increased by at least 10 times), thus greatly improving an accuracy of fingerprint identification.

BRIEF DESCRIPTION OF THE DRAWINGS

In order to more clearly illustrate the technical solutions of the present disclosure, embodiments of the present disclosure will be briefly described below with reference to the drawings. However, the drawings are not intended to limit the embodiments of the present disclosure.

DETAILED DESCRIPTION OF EMBODIMENTS

As described in the background part, the conventional fingerprint identification apparatus has many deficiencies. Specifically, in fingerprint identification for a dry finger, there is a problem that the collected fingerprint image cannot be identified due to a low definition.

A "dry finger" described herein refers to a finger with a shallow skin grain at a finger pulp, a finger with a high dryness, a finger with insufficiently secreted sebum or the like, the collected fingerprint image of which has a light and thin fingerprint grain with a low definition. For example, compared with a finger with normally secreted sebum, the finger with insufficiently secreted sebum has a hard fingerprint grain, such that a contact area of the fingerprint grain (such as a convex grain) with a fingerprint collection screen of a fingerprint collector does not change with a change of a pressing force of the finger in a case that the finger presses the fingerprint collector, which results in a thin and light line in the finally collected fingerprint image, thereby resulting in an overall un-sharp image.

It has been found by research and analysis that, the conventional fingerprint identification apparatus has a low signal-to-noise ratio. Specifically, with the conventional imaging structure with uniform illumination, light emitted from pixels in a display unit may affect the imaging of light reflected by a nonopaque glass cover plate after being irradiated upward and light scattered by a to-be-identified fingerprint and passes through a lens. Further, it has been found by deep research and analysis that, in the conventional fingerprint identification apparatus, only no more than 4% of the light irradiated toward the to-be-identified fingerprint can be reflected, in which a small portion can passes through the lens and is successfully imaged onto a sensing unit. Therefore, it is difficult for light scattered by the to-be-identified fingerprint after passing through the nonopaque glass cover plate to form an effective fingerprint image due to factors such as a dry finger. Since the conventional fingerprint identification apparatus can only image a to-be-identified fingerprint (for example, a finger) that is in good contact with the fingerprint identification apparatus or a portion of a to-be-identified fingerprint that is in full contact with the nonopaque glass cover plate of the fingerprint identification apparatus by pressing, a fingerprint image of the dry finger collected by the conventional fingerprint identification apparatus has a low definition due to a small contact area of the dry finger with the nonopaque glass cover plate.

Based on this, a fingerprint identification apparatus is provided according to the present disclosure. The fingerprint identification apparatus is provided with an optical film, which is printed with multiple light-transmitting regions and multiple light-blocking regions that are arranged in an alternatively bright and dark manner, such that a sharp image of a to-be-identified fingerprint (whether or not the to-be-identified fingerprint is from a dry finger) can be collected, thereby significantly increasing a signal-to-noise ratio by at least 10 times, thus greatly improving an accuracy of fingerprint identification.

Technical contents, features, objectives, and effects of the technical solutions of the present disclosure are described in detail below in conjunction with specific embodiments and drawings.

Figure 1:
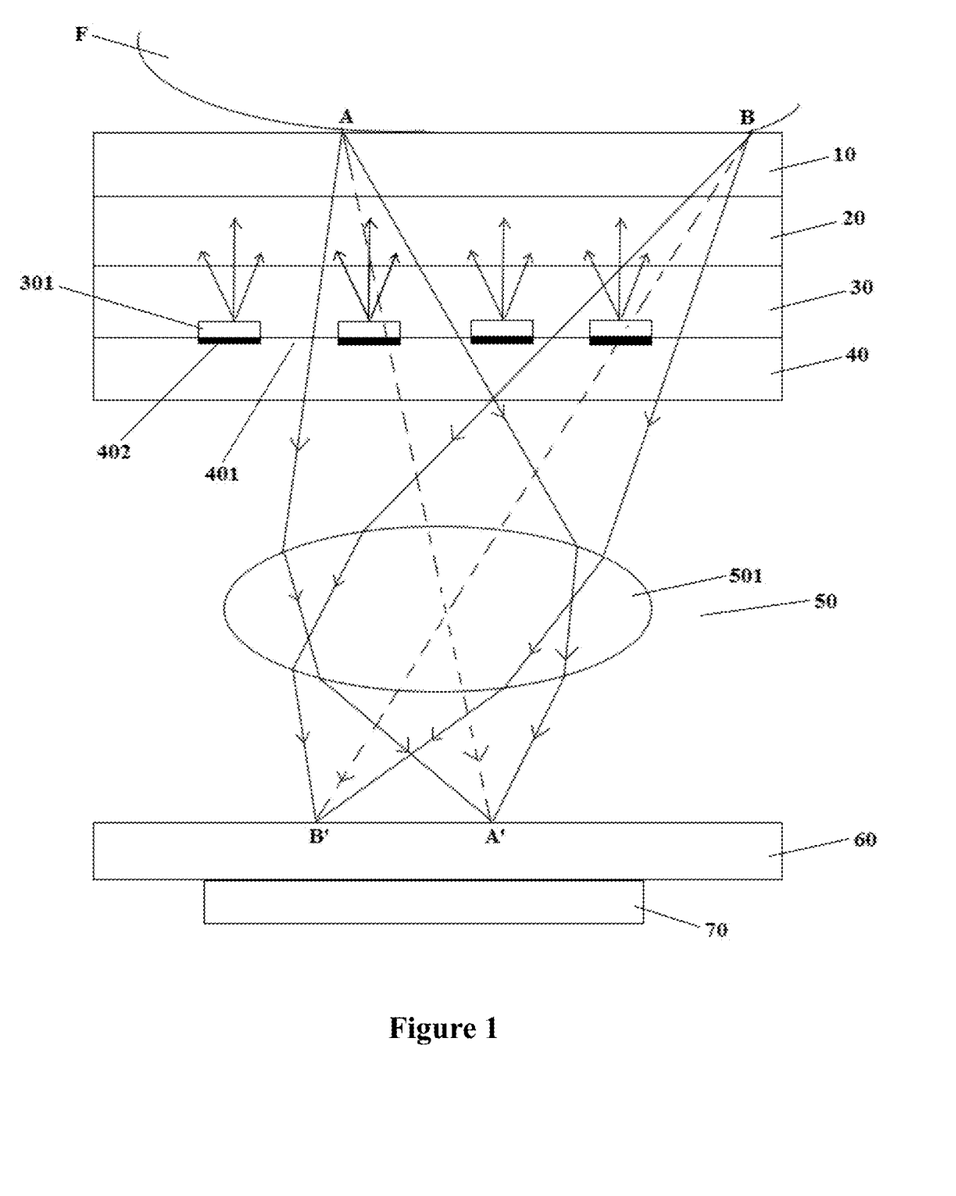
FIG. 1 is a schematic structural diagram of a fingerprint identification apparatus according to an embodiment of the present disclosure.

Reference is made to FIG. 1, which is a schematic structural diagram of a fingerprint identification apparatus according to an embodiment of the present disclosure. The fingerprint identification apparatus includes a nonopaque glass cover plate 10, a touch sensing unit 20, a display unit 30, an optical film 40, an imaging unit 50, a photoelectric sensing unit 60 and a control unit 70 that are sequentially arranged from top to bottom.

The nonopaque glass cover plate 10 has a touch interface for contacting with a to-be-identified fingerprint F. In some embodiments, the nonopaque glass cover plate 10 may be a glass cover plate.

The touch sensing unit 20 is configured to detect a touch signal of the to-be-identified fingerprint F.

The display unit 30 is provided with pixels in one or more discrete point light source regions. In a non-limiting embodiment of the present disclosure, the point light source regions are arranged in a topological structure and are spaced apart from each other by a lightless pixel 302 (not shown). Each of the point light source regions includes one or more pixels (such as a pixel 301 which is driven to be lightened and the lightless pixel 302). In a non-limiting embodiment of the present disclosure, the topological structure includes a single-point arrangement, a multi-point arrangement, a linear arrangement, a parallel line arrangement, a circular arrangement, a circular ring arrangement, a dotted line arrangement, or a parallel dotted line arrangement.

The optical film 40 is a transparent optical thin film, which is capable of transmitting light with a specific range of wavelength, for example, a green light with a wavelength of 520 nm to 550 nm, and filtering out other light that does not meet the condition. In order to effectively collect and identify an image of a to-be-identified fingerprint (especially a to-be-identified fingerprint of a dry finger), the optical film 40 is provided with multiple light-transmitting regions 401 and multiple light-blocking regions 402 arranged in an alternatively bright and dark manner. The light-blocking regions 402 are used for blocking light emitted from the pixel 301 in the display unit 30 downward. The multiple light-blocking regions 402 and the multiple light-transmitting regions 401 are arranged alternatively with one being surrounded by another. With this design, an effective fingerprint image can be obtained by the photoelectric sensing unit 60 with light scattered from the to-be-identified fingerprint.

In a non-limiting embodiment of the present disclosure, the light-blocking regions 402 are located right below at least a part of pixels 301 in the display unit which are driven to be lightened, and an area of each of the light-blocking regions 402 is equal to or greater than that of the at least a part of pixels 301. The light-blocking regions 402 may be an opaque black printed pattern. In a non-limiting embodiment of the present disclosure, the light-transmitting regions 401 are located right below the lightless pixel 302 for light scattered from the to-be-identified fingerprint to pass through.

In a non-limiting embodiment of the present disclosure, the optical film 40 may have a rectangular, square, or circular shape. Preferably, the optical film 40 has a circular shape. In a non-limiting embodiment of the present disclosure, the optical film 40 has an area smaller than or equal to that of the display unit 30. Alternatively, the optical film 40 has a diameter smaller than or equal to a length (and/or a width) of the display unit 30.

The light-transmitting regions 401 and the light-blocking regions 402 may be designed based on the shape of the optical film 40.

Figure 2:
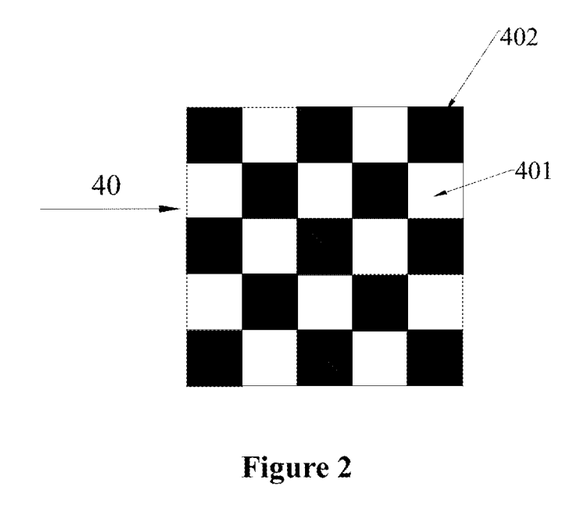
FIG. 2 is a schematic structural diagram of an optical film according to an embodiment of the present disclosure.

For example, reference is made to FIG. 2. In a non-limiting embodiment of the present disclosure, if the optical film 40 has a square (or rectangular) shape, the light-transmitting regions 401 and the light-blocking regions 402 may be designed to have a smaller square (or rectangular) shape. The optical film 40 includes multiple light-transmitting regions 401 and multiple light-blocking regions 402 arranged in an alternatively bright and dark manner, and the multiple light-blocking regions 402 and the multiple light-transmitting regions 401 are arranged alternatively with one being surrounded by another. In a non-limiting embodiment of the present disclosure, the light-transmitting regions 401 has a size (length or width) $L_1$ of 0.1 mm to 5 mm, preferably 0.2 mm to 0.5 mm, and more preferably 0.2 mm. In a non-limiting embodiment of the present disclosure, the light-blocking regions 402 has a size (length or width) $L_2$ of 0.1 mm to 5 mm. In some embodiment, $L_2 \le L_1$.

Figure 3:
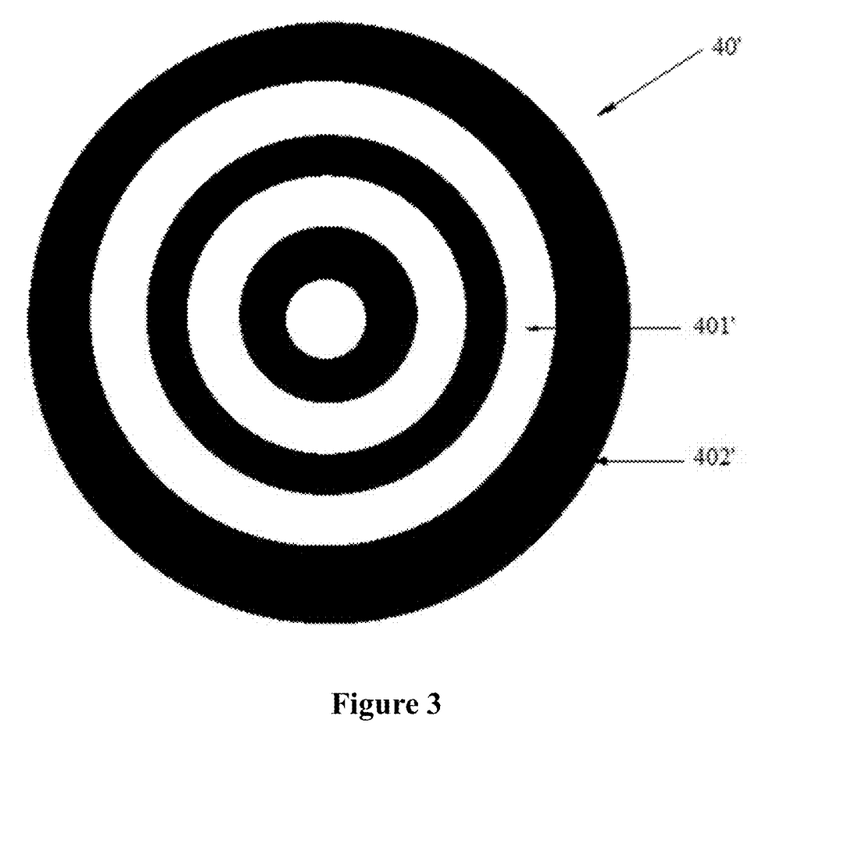
FIG. 3 is a schematic structural diagram of an optical film according to another embodiment of the present disclosure.

As another example, reference is made to FIG. 3. In a non-limiting embodiment of the present disclosure, if an optical film 40' has a circular shape, which is printed with multiple light-transmitting regions 401' and multiple light-blocking regions 402' (each of which has a circular ring shape) arranged in an alternatively bright and dark manner, and the multiple light-blocking regions 402' and the multiple light-transmitting regions 401' are arranged alternatively with one being surrounded by another. In a non-limiting embodiment of the present disclosure, the light-transmitting regions 401' have a radial width $d_1$ of 0.1 mm to 5 mm, preferably 0.2 mm to 0.5 mm, and more preferably 0.2 mm. In a non-limiting embodiment of the present disclosure, the light-blocking regions 402' have a radial width $d_2$ of 0.1 mm to 5 mm, and $d_2 \le d_1$.

The imaging unit 50 includes a lens group, and the lens group includes at least one lens 501. The imaging unit 50 is configured to image the to-be-identified fingerprint F to which light emitted from the pixel 301 is irradiated via the nonopaque glass cover plate 10 onto the photoelectric sensing unit 60. It is required to locate the lens 501 at a position such that the to-be-identified fingerprint F is imaged onto the photoelectric sensing unit 60, where light emitted by the pixel 301 is irradiated to the to-be-identified fingerprint F via the nonopaque glass cover plate 10, and then passes through the light-transmitting regions of the optical film after being reflected (scattered) by the to-be-identified fingerprint F. For example, the lens 501 is set to have an object focus smaller than 1 mm. In a non-limiting embodiment of the present disclosure, the imaging unit 50 has an object focus located in a plane where the optical film 40 is located.

The photoelectric sensing unit 60 is configured to receive a light signal emitted by the imaging unit 50, and convert the light signal to an electric signal, the light signal is analyzed and an image of the to-be-identified fingerprint F is output.

The control unit 70 is configured to send a display driving signal to the display unit 30 when the touch sensing unit 20 detects the touch signal, to drive at least a part of pixels 301 in the display unit to be lightened.

It should be appreciated by those skilled in the art that FIG. 1 is only a simple schematic structural diagram shown for convenience of explaining positional relationship of various component units of the fingerprint identification apparatus of the present disclosure, rather than that of a real object. Therefore, the shape or size of each component shown in FIG. 1 is not intended to limit the technical solutions of the present disclosure.

Figure 4:
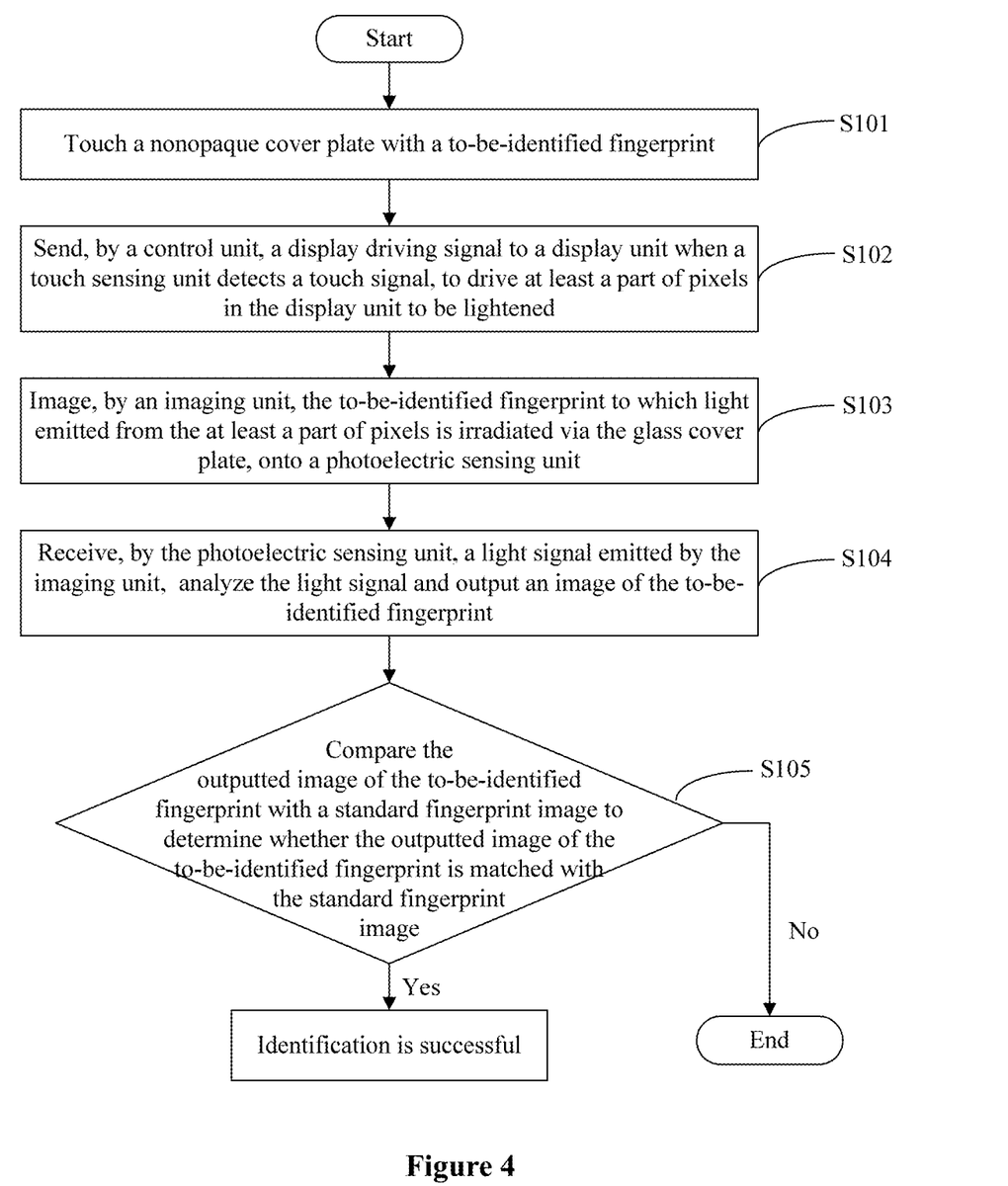
FIG. 4 is a schematic flowchart of a fingerprint identification method according to an embodiment of the present disclosure.

Reference is made to FIG. 4, which is a schematic flowchart of a fingerprint identification method according to an embodiment of the present disclosure. In a non-limiting embodiment of the present disclosure, the fingerprint identification method includes the following steps S101 to S105. In S101, a nonopaque glass cover plate is touched with a to-be-identified fingerprint. In S102, a control unit sends a display driving signal to a display unit when a touch sensing unit detects a touch signal, to drive at least a part of pixels in the display unit to be lightened. In S103, an imaging unit images the to-be-identified fingerprint to which light emitted by the pixels is irradiated via the nonopaque glass cover plate, onto a photoelectric sensing unit. In S104, the photoelectric sensing unit receives a light signal emitted by the imaging unit, and convert the light signal to an electric signal, the light signal is analyzed and an image of the to-be-identified fingerprint F is output. In S105, the outputted image of the to-be-identified fingerprint is compared with a standard fingerprint image to determine whether the outputted image of the to-be-identified fingerprint is matched with the standard fingerprint image. If the outputted image of the to-be-identified fingerprint is similar to the standard fingerprint image, it is determined that the identification is successful; and if the outputted image of the to-be-identified fingerprint is not similar to the standard fingerprint image, the process ends or it is determined that the identification is failed.

In a non-limiting embodiment of the present disclosure, the imaging unit images the to-be-identified fingerprint onto the photoelectric sensing unit, where the light emitted from the pixels is irradiated to the to-be-identified fingerprint via the nonopaque glass cover plate, and then passes through the multiple light-transmitting regions of the optical film after being reflected by the to-be-identified fingerprint.

In a non-limiting embodiment of the present disclosure, an electronic device is provided, which includes the fingerprint identification apparatus described above. For the specific structure of the fingerprint identification apparatus, reference is made to the above description, which is not repeated here.

In a non-limiting embodiment of the present disclosure, a computer-readable storage medium is provided, which has stored thereon computer instructions. The computer instructions, when being executed, perform steps of the method described above, which is not repeated here.

In a non-limiting embodiment of the present disclosure, a terminal is provided, which includes a memory and a processor, where the memory has stored thereon computer instructions. The computer instructions, when being executed by the processor, perform the steps of the method described above, which is not repeated here.

In a non-limiting embodiment of the present disclosure, the terminal includes, but is not limited to, a personal computer, a server, a general purpose computer, a special purpose computer, a network device, an embedded device, a programmable device, a smart mobile terminal (such as a mobile phone, an IPAD, a POS machine), a smart home device (such as a smart fingerprint lock), a wearable smart device, an on-board smart device, a fingerprint identification apparatus (such as a fingerprint card punch or an attendance machine).

It should be noted that although the above embodiments are described herein, the protection scope of the present disclosure is not limited thereto. Therefore, based on the innovative concepts of the present disclosure, changes and modifications to the described embodiments herein, transformations of the equivalent structures or equivalent processes made based on the description and the drawings of the present disclosure, and direct or indirect application the above technical solutions in other related technical fields should all included in the protection scope of the present disclosure.

The invention claimed is:

1. A fingerprint identification apparatus, comprising: a nonopaque glass cover plate, a display unit, an optical film, an imaging unit, and a photoelectric sensing unit, wherein
    the nonopaque glass cover plate has a touch interface for contacting a to-be-identified fingerprint; the display unit is provided with a plurality of pixels, a part of the plurality of pixels form one or more point light source regions; the optical film is provided with a light-transmitting region and a light-blocking region, the light-transmitting region allows light to pass through the optical film and the light-blocking region are configured for preventing light from passing through the optical film;
    light emitted from the one or more point light source region is reflected by an upper surface of the nonopaque glass cover plate, the reflected light passes through the nonopaque glass cover plate, the display unit, and the light-transmitting region of the optical film, and is imaged by the imaging unit onto the photoelectric sensing unit.

2. The fingerprint identification apparatus according to claim 1, wherein the light-blocking region is configured to block light emitted from the part of pixels that directly enters the optical film without being reflected by the upper surface of the nonopaque glass cover plate or the to-be-identified fingerprint.

3. The fingerprint identification apparatus according to claim 1, wherein the optical film is disposed at a side of the display unit far from the nonopaque glass cover plate, the light-blocking region is disposed right below at least a part of the point light source region, and an area of the light-blocking region is equal to or greater than an area of the point light source region.

4. The fingerprint identification apparatus according to claim 1, wherein the imaging unit has an object focus located in a plane where the optical film is located.

5. The fingerprint identification apparatus according to claim 1, wherein the optical film comprises a plurality of light-transmitting regions and a plurality of light-blocking regions, and the plurality of light-blocking regions and the plurality of light-transmitting regions are arranged alternatively with one being adjacent to another.

6. The fingerprint identification apparatus according to claim 1, wherein the optical film has an area smaller than or equal to that of the display unit; or the optical film has a dimension along a direction smaller than or equal to that of the display unit.

7. The fingerprint identification apparatus according to claim 1, wherein each of the plurality of light-transmitting regions has a size $L_1$ of 0.1 mm to 5 mm; each of the plurality of light-blocking regions has a size $L_2$ of 0.1 mm to 5 mm, and $L_2 \leq L_1$.

8. The fingerprint identification apparatus according to claim 1, wherein the point light source regions are spaced apart from each other by a lightless pixel region, the light-transmitting region is located right below the lightless pixel region.

9. The fingerprint identification apparatus according to claim 1, wherein the optical film has a rectangular, square, or circular shape.

10. The fingerprint identification apparatus according to claim 1, wherein the optical film is configured to transmit light with a specific range of wavelength.

11. The fingerprint identification apparatus according to claim 1, further comprising a touch sensing unit, wherein the touch sensing unit is configured to detect a touch signal of the to-be-identified fingerprint.

12. The fingerprint identification apparatus according to claim 11, further comprising a control unit, wherein the control unit is configured to send a display driving signal to the display unit when the touch sensing unit detects the touch signal, to drive at least a part of the pixels in the display unit to be lightened.

13. The fingerprint identification apparatus according to claim 1, wherein the imaging unit comprises a lens or a lens group comprising multiple lens.

14. The fingerprint identification apparatus according to claim 1, wherein the display unit comprises a plurality of point light source regions arranged in a topological structure, and each of the plurality of point light source regions comprises one or more pixels.

15. The fingerprint identification apparatus according to claim 14, wherein the topological structure comprises a multi-point arrangement, a linear arrangement, a parallel line arrangement, a circular arrangement, a circular ring arrangement, a dotted line arrangement, or a parallel dotted line arrangement.

16. A fingerprint identification method applied to the fingerprint identification apparatus according to claim 12, comprising:

sending, by the control unit, a display driving signal to the display unit to drive at least a part of pixels in the display unit to be lightened, when the touch sensing unit detects a touch signal that a to-be-identified fingerprint touches the nonopaque glass cover plate;

outputting an image of the to-be-identified according to the light signal received by the photoelectric sensing unit;

comparing the outputted image of the to-be-identified fingerprint with a standard fingerprint image to determine whether the outputted image of the to-be-identified fingerprint is matched with the standard fingerprint image.

17. An electronic device, comprising: the fingerprint identification apparatus according to claim 1.

* * * * *